US006997604B2

(12) United States Patent
Hanzawa et al.

(10) Patent No.: US 6,997,604 B2
(45) Date of Patent: Feb. 14, 2006

(54) TEMPERATURE SENSOR

(75) Inventors: Go Hanzawa, Aichi (JP); Masahiko Nishi, Aichi (JP); Masaki Iwaya, Gifu (JP); Takaaki Chosokabe, Ichinomiya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 10/751,954

(22) Filed: Jan. 7, 2004

(65) Prior Publication Data
US 2004/0135664 A1 Jul. 15, 2004

(30) Foreign Application Priority Data
Jan. 7, 2003 (JP) .................. P. 2003-001010

(51) Int. Cl.
*B21F 7/00* (2006.01)
*G01K 7/22* (2006.01)
*G01K 7/16* (2006.01)

(52) U.S. Cl. ............... 374/163; 374/208; 374/185; 140/149

(58) Field of Classification Search ............... 374/163, 374/100, 185, 208, 179, 180; 338/22 R; 136/200; 140/149; 174/128.1, 128.2, 126.1, 174/126.2
See application file for complete search history.

(56) References Cited

U.S. PATENT DOCUMENTS

| | | | | |
|---|---|---|---|---|
| 1,939,875 A | * | 12/1933 | Bush | 174/13 |
| 2,217,284 A | * | 10/1940 | Lunt | 174/25 R |
| 2,318,601 A | * | 5/1943 | Doble | 374/110 |
| 2,321,846 A | * | 6/1943 | Obermaier | 174/52.3 |
| 2,518,789 A | * | 8/1950 | Jackson | 337/415 |
| 2,758,183 A | * | 8/1956 | Canegallo | 264/105 |
| 2,842,648 A | * | 7/1958 | Reynolds | 338/26 |
| 3,317,353 A | * | 5/1967 | Bingham | 136/233 |
| 3,428,926 A | * | 2/1969 | Bogner et al. | 335/216 |
| 3,673,315 A | * | 6/1972 | Lasley | 174/107 |
| 3,793,526 A | * | 2/1974 | Collmann et al. | 378/61 |
| 3,805,218 A | | 4/1974 | Voida | |
| 4,041,237 A | * | 8/1977 | Stine et al. | 174/36 |
| 4,120,201 A | * | 10/1978 | Wargo | 374/181 |
| 4,224,461 A | * | 9/1980 | Snyder et al. | 136/233 |
| 4,348,584 A | * | 9/1982 | Gale et al. | 219/549 |
| 4,369,795 A | * | 1/1983 | Bicher et al. | 600/549 |
| 4,484,018 A | * | 11/1984 | McLynn | 136/230 |
| 4,789,850 A | * | 12/1988 | Sepso et al. | 338/25 |
| 4,858,063 A | * | 8/1989 | Laue et al. | 361/286 |
| 5,133,121 A | * | 7/1992 | Birbeck et al. | 29/872 |
| 5,198,621 A | * | 3/1993 | Kojima | 174/128.1 |
| 5,367,282 A | * | 11/1994 | Clem | 338/22 R |
| 5,969,229 A | | 10/1999 | Hori et al. | |

(Continued)

FOREIGN PATENT DOCUMENTS

DE          564 805 C       11/1932

(Continued)

*Primary Examiner*—Gail Verbitsky
(74) *Attorney, Agent, or Firm*—Sughrue Mion, PLLC

(57) ABSTRACT

A temperature sensor comprising: a housing; a thermo-sensitive element housed in the housing for outputting electric characteristics varying with a temperature, as an electric signal; and a pair of lead wires connected at their one-side ends with the thermo-sensitive element for extracting the electric signal from the thermo-sensitive element to an outside of the housing, wherein at least one of the lead wires is made of a mixed twisted wire including: first electric wires made of a first conductor containing copper; and second electric wires made of a second conductor having a higher bending resistance and a tensile strength than those of the first conductor.

6 Claims, 2 Drawing Sheets

U.S. PATENT DOCUMENTS

| | | | |
|---|---|---|---|
| 6,104,011 A | * | 8/2000 | Juliano .................... 219/544 |
| 6,168,570 B1 | * | 1/2001 | Ferrera .................... 600/585 |
| 6,286,995 B1 | * | 9/2001 | Takahashi et al. .......... 374/148 |
| 6,476,329 B1 | * | 11/2002 | Tsukamoto et al. ...... 174/117 F |
| 6,559,385 B1 | * | 5/2003 | Johnson et al. .......... 174/126.1 |
| 6,576,844 B1 | * | 6/2003 | Kamata .................... 174/126.1 |
| 2002/0129969 A1 | | 9/2002 | Groegl et al. |

FOREIGN PATENT DOCUMENTS

| | | | | |
|---|---|---|---|---|
| DE | 11 63 416 B | | | 2/1964 |
| FR | 2 797 687 A | | | 2/2001 |
| JP | 54141879 A | * | | 11/1979 |
| JP | 63-19709 | | | 2/1988 |
| JP | 03020632 A | * | | 1/1991 |
| JP | 04150075 A | * | | 5/1992 |
| JP | 05074601 A | * | | 3/1993 |
| JP | 05223648 A | * | | 8/1993 |
| JP | 5-264368 A | | | 10/1993 |
| JP | 9-147631 | | | 6/1997 |
| JP | 2001-56256 A | | | 2/2001 |

* cited by examiner

TEMPERATURE SENSOR

FIELD OF THE INVENTION

The present invention relates to a temperature sensor. This temperature sensor of the invention is suitably used in the case for detecting the temperature of the exhaust gas or the like of a vehicle.

BACKGROUND OF THE INVENTION

The temperature sensors of JP-A-2001-56256 and JP-A-5-264368 are known in the related art. These temperature sensors are individually provided with: a housing; a thermo-sensitive element housed in the housing for outputting electric characteristics varying with the temperature, as an electric signal; and a pair of lead wires connected at their one-side ends through a pair of core wires with the thermo-sensitive element for extracting the electric signal from the thermo-sensitive element to the outside of the housing. The temperature sensor of JP-A-2001-56256 uses SUS wires (or stainless steel wires) as those lead wires, and the temperature sensor of JP-A-5-264368 uses copper wires (or nickel-plated annealed copper wires).

According to these temperature sensors, the thermo-sensitive element has its electric characteristics changed by the atmospheric temperature, so that the electric signal corresponding to the change is transmitted through the two core wires to the two lead wires and is obtained from a connector connected with the individual other ends of the two lead wires. These temperature sensors are used for detecting the temperature of the exhaust gases or the like of the vehicle.

SUMMARY OF THE INVENTION

However, the aforementioned temperature sensors of the related art have a disadvantage when they are mounted in the vehicle, because the individual lead wires are made of the SUS wires or copper wires.

Specifically, the temperature sensors have lead wires of different lengths according to the kinds of the vehicles to be mounted with themselves. For example, the lead wires have a length of 250 mm, when the temperature sensor is arranged in the engine room, and have a length of 1,500 mm when arranged under the floor of the automobile. In this case, the difference of 1,250 mm exists between the lengths of the lead wires of the two. If two lead wires are used for one temperature sensor, they have a length difference as large as 2,500 mm. In case the lead wires are made of the SUS wires having a higher resistance than that of the good conductor of copper, therefore, their resistance becomes highly different according to the length. Even if the temperature to be detected by the thermo-sensitive element is equal, therefore, the magnitude of the electric signal to be outputted from the temperature sensor may be made highly different by the difference between the lengths of the lead wires. Especially in case the thermo-sensitive element is characterized to change to a resistance as high as that of the lead wires in dependence upon the temperature, the resistance of the temperature sensor, as viewed from the connector, may be made highly different by the difference between the lengths of the lead wires, and may be easily subject to the influences of the lengths of the lead wires, that is the difference between the resistances of the lead wires. Even if the temperature characteristics of the temperature sensor or the variation of the electric signal to the change in the temperature should be corrected according to the lengths of the lead wires by means of a hardware or software, moreover, the individual adjustments or changes according to the lengths of the lead wires are necessary so that the temperature sensor is troublesome in handling. Especially in recent years, the demand for enlarging the temperature detecting range and improving the temperature detecting precision becomes stronger with the output range of the electric signal being left as it is. Therefore, the change in the electric signal for the temperature of 1° C. becomes lower than that of the related art, and the difference between the resistances of the lead wires due to the difference in the length cannot be ignored to make the handling inconveniences notable.

In case the lead wires are made of the copper wires, on the other hand, the resistance is low, and the difference between the resistances of the lead wires due to the difference in the length is so small that the temperature can be highly precisely without any correction of the temperature characteristics according to the length of the lead wires. However, the copper wires have a low bending resistance and a low tensile strength. Therefore, the temperature sensor having the lead wires made of the copper wires may be disconnected by the use of a long period and may be feared in its durability.

The invention has been conceived in view of the background of the aforementioned related art, and has an object to provide a temperature sensor, which can detect the temperature in an excellent precision without any correction according to the length of the lead wires and which can exhibit an excellent durability.

According to the invention, there is provided a temperature sensor comprising: a housing; a thermo-sensitive element housed in the housing for outputting electric characteristics varying with the temperature, as an electric signal; and a pair of lead wires connected at their one-side ends with the thermo-sensitive element for extracting the electric signal from the thermo-sensitive element to the outside of the housing, wherein each of the lead wires is made of a mixed twisted wire including: first electric wires made of a first conductor containing copper; and second electric wires made of a second conductor having a higher bending resistance and a tensile strength than those of the first conductor.

In the temperature sensor of the invention, each of the lead wires is made of the mixed twisted wire including the first electric wires and the second electric wires. The first electric wires are made of the first conductor containing copper so that the difference in the resistance due to the difference between the lengths of the lead wires is remarkably small. Even without any correction of the temperature characteristics of the temperature sensor according to the length of the lead wires, the error of the temperature detected raises no problem in the precision. On the other hand, the second electric wires are made of the second conductor having a higher bending resistance and a higher tensile strength than those of the first conductor, so that they can be prevented from being disconnected by the use of a long period thereby to exhibit an excellent durability.

According to the temperature sensor of the invention, therefore, it is possible to detect the temperature in an excellent precision without any correction according to the length of the lead wires and to exhibit an excellent durability.

In the temperature sensor of the invention, nickel-plated copper, tin-plated copper, a copper alloy containing tin or the like can be adopted as the first conductor. The second conductor is preferred to contain nickel. This is because nickel has a high bending resistance and a high tensile strength. Stainless steel is preferable for that second conductor. This is because stainless steel contains nickel so that it is easily available to lower the manufacturing cost. Here, the lead wires could include third electric wires having various characteristics in addition to the first electric wires and the second electric wires.

In the temperature sensor of the invention, it is preferred that each of the lead wires has the first electric wires enclosing the second electric wires. Usually, the individual lead wires are caulked at their one-end sides to the paired core wires and are connected through the individual core wires with the thermo-sensitive element. On the other hand, the other-end sides of the individual lead wires are caulked and connected with the connector. If the second electric wires are enclosed by the first electric wires made of the first conductor containing properly soft copper, therefore, the individual lead wires are satisfactorily caulked and are properly connected with the core wires and the connector. As a result, the contact resistance at the connecting portions between the lead wires and the core wires or the connector can be reduced to exhibit the excellent durability.

A thermistor, a metallic resister or the like can be adopted as the thermo-sensitive element. The temperature sensor of the invention has prominent effects in case an element having a low minimum resistance within a measurement temperature range is used as the thermo-sensitive element. Specifically, the effects are prominent in case the thermo-sensitive element is exemplified by a thermistor having a minimum resistance not higher than 100 Ω within a measurement temperature range (of 100 to 900° C., for example) or a platinum resistance element having a minimum resistance not higher than 200 Ω within a measurement-temperature range (of −40 to 900° C., for example) In case the thermo-sensitive element is the thermistor element, excellent effects are obtained in case the thermistor element used has a low B constant (not larger than 3,000 K, for example) In case the minimum resistance within the measurement temperature range of the thermo-sensitive element is thus low, it may occur that the difference in the resistance due to the difference between the lengths of the lead wires cannot be ignored. In the temperature sensor of the invention, on the contrary, the difference in the resistance due to the difference between the lengths of the lead wires is so small that the temperature sensor can exhibit a high temperature detecting precision reliably.

DESCRIPTION OF REFERENCE NUMERALS AND SIGNS

1—HOUSING
5—THERMO-SENSITIVE ELEMENT (THERMISTOR)
6, 26—LEAD WIRES
7, 27—SECOND ELECTRIC WIRES
8, 28—FIRST ELECTRIC WIRES

DETAILED DESCRIPTION OF THE INVENTION

An embodiment of the invention will be described with reference to the accompanying drawings.

Figure 1:
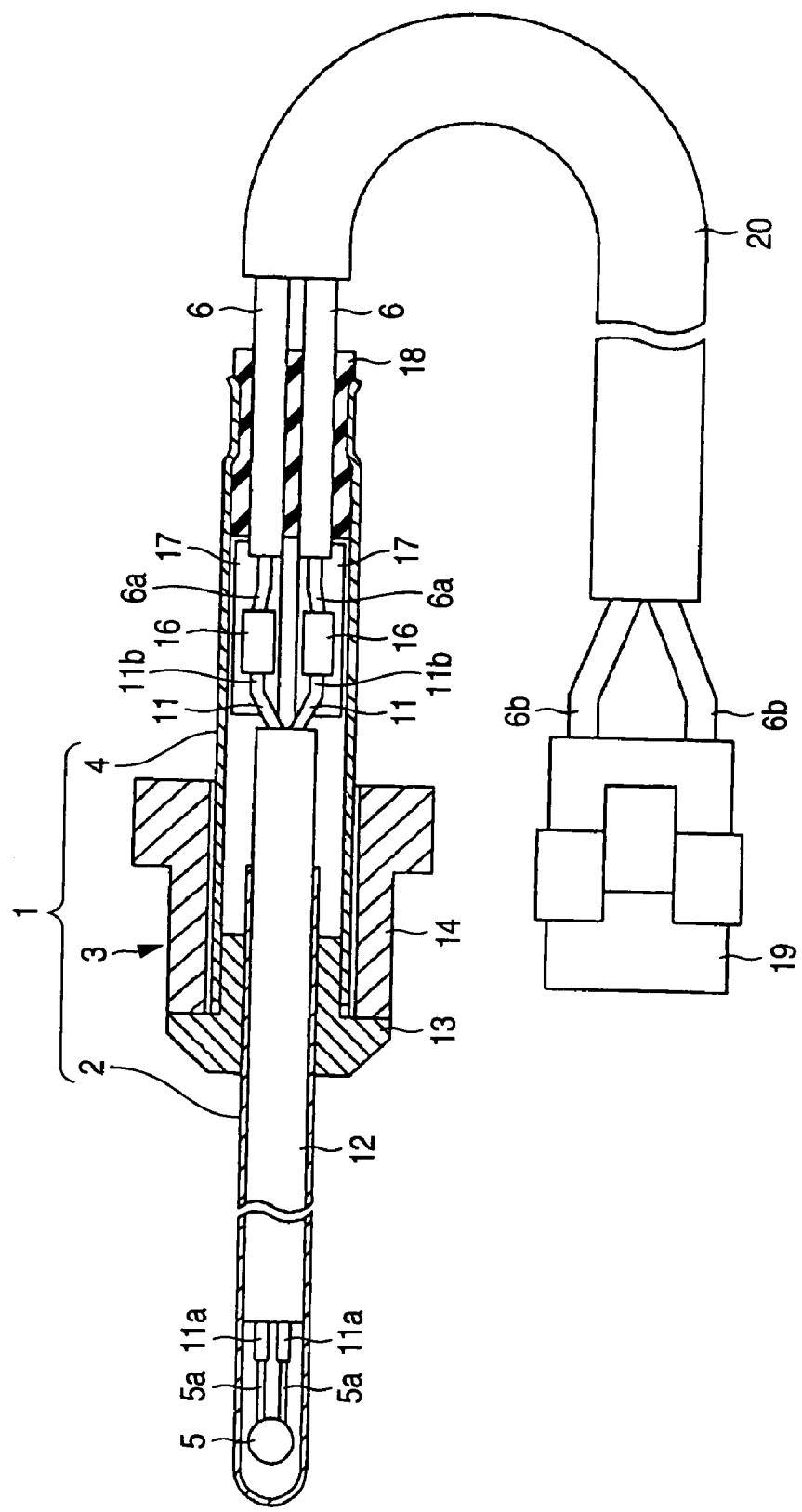
FIG. 1 is a sectional view of a temperature sensor of the embodiment.

FIG. 1 shows a sectional view of a temperature sensor of the embodiment. This temperature sensor is mounted in the exhaust passage of a not-shown vehicle and is used for detecting the temperature of the exhaust gas over a wide range. This temperature sensor is provided with: a housing 1; a thermistor housed in the housing 1 for acting as a thermo-sensitive element to output the electric characteristics varying with the temperature, as an electric signal; and a pair of lead wires 6 for extracting the electric signal from the thermistor 5 to the outside of the housing 1.

More specifically, the housing 1 is constructed of a first housing 2, a nut portion 3 and a second housing 4. The first housing 2 is formed into a cylindrical shape having a closed leading end. On the leading end side of this first housing 2, there is arranged the thermistor 5 for outputting a resistance varying with the temperature, as the electric signal to a pair of electrodes 5a. These paired electrodes 5a are connected with the one-side ends 11a of a pair of core wires 11. These two core wires 11 are sheathed with a sheath 12 and are protruded from the root end of the first housing 2.

The second housing 4 is formed in a cylindrical shape having a larger diameter than that of the first housing 2. Moreover, the leading end side of the second housing 4 and the root end side of the first housing 2 are overlapped and arranged coaxially and are jointed to each other at the rear end of a flange 13.

On the other hand, the nut portion 3 is composed of the flange 13 for preventing the leakage of a fluid, the temperature of which is to be detected, and a nut 14 for fixing the temperature sensor in the exhaust passage or the like. The flange 13 is fixed on the root end side of the first housing 2, and the leading end of the second housing 4 is fixed on the rear end of the flange 13. Moreover, the nut 14 is turnably disposed at the flange 13 on the side of the second housing 4.

The other ends 11b of the paired core wires 11, as protruded from the root end of the first housing 2, are caulked to the one-side ends 6a of the paired lead wires 6 by caulking terminals 16. Moreover, the other-side ends 11b of the core wires 11 and the one-side ends 6a of the lead wires 6 are sheathed with an insulating tube 17 together with the caulking terminals 16.

On the root end side of the second housing 4, on the other hand, there is caulked and fixed a grommet 8, which is made of heat-resisting rubber. The paired lead wires 6 are protruded through the grommet 8 from the root end of the second housing 4. The lead wires 6 are sheathed with a protecting tube 20 and are connected at their other ends 6b with a connector 19.

Figure 2:
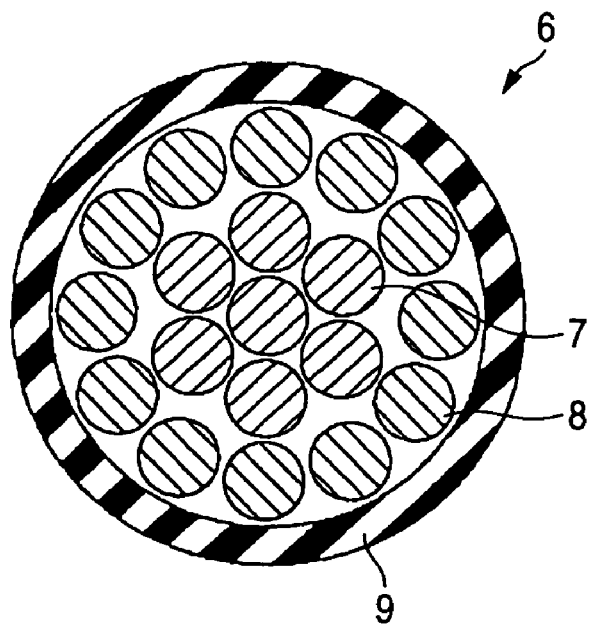
FIG. 2 is a sectional view of a lead wire according to the temperature sensor of an embodiment.

As shown in FIG. 2, the lead wires 6 are composed of second electric wires 7 or seven stainless steel wires at the central portion, and first electric wires 8 or twelve nickel-plated annealed copper wires enclosing the seven second electric wires 7. The individual second electric wires 7 and the individual first electric wires 8 are twisted into a mixed wire, and this mixed wire is sheathed with an insulating material 9. The stainless steel makes the second conductor, and the nickel-plated annealed copper makes the first conductor.

The temperature sensor of the embodiment thus constructed uses the thermistor 5 as the thermo-sensitive element so that it can detect the temperature in terms of the resistance of the thermistor 5. In this temperature sensor, moreover, the mixed twisted wire has the second electric wires 7 of stainless steel and the first electric wires 8 of nickel-plated annealed copper. The first electric wires 8 are made of nickel-plated annealed copper so that the difference in the resistance due to the difference in the length of the lead wires 6 is drastically small. Even unless the temperature characteristics of the temperature sensor are corrected according to the length of the lead wires 6, therefore, the error of the detected temperature raises no problem in precision. On the other hand, the second electric wires 7 are made of stainless steel having high bending resistance and tensile strength, so that the lead wires 6 can be prevented from being disconnected even after a long use, thereby to exhibit an excellent durability.

Here will be examined the case, in which a thermistor having a B-constant of 4,000 K and a resistance of 70 Ω at 900° C. is applied to the embodiment. In case the lead wires of the temperature sensor are made exclusively of SUS wires having a sectional area of 0.74 mm$^2$ at the conductor portion and a length of 2,500 mm, the lead wires have a resistance of 2.8 Ω. When the temperature sensor provided with the thermistor having the above-specified characteristics is placed under the condition of 900° C., according to our calculations, the resistance of 2.8 Ω of the aforementioned lead wires corresponds, when converted into the temperature, to about 13° C. If the length difference of the lead wires is 2,500 mm between the two temperature sensors, there exists an error in the detected temperature of about 13° C. When the lead wires 6 of the embodiment having a conductor portion of a sectional area of 0.37 mm$^2$ and a length of 2,500 mm is placed under the condition of 900° C., on the other hand, their temperature-converted value corresponds to about 1° C. Even if the two temperature sensors have a lead wire length difference of 2,500 mm, therefore, what exists is the error of the detected temperature of about 1° C. In the temperature sensor of the embodiment, therefore, it is understood that no temperature correction is necessary no matter how long the lead wires 6 might be.

Moreover, bending tests were done on both the individually five lead wires, which were composed of only the nickel-plated annealed copper wires having a length of 1,500 mm and a sectional area of 0.60 mm$^2$ at their conductor portions, and the lead wires 6 of the embodiment having a length of 1,500 mm. In the tests, a weight of 500 g was attached to the lower end of the vertically fixed lead wires, and the lead wires above the fixed portions were bent by 90 degrees alternately to the right and left at a predetermined speed, so that the number of bends (as counted by one rightward and leftward bend) when the lead wires were disconnected were examined. As a result, all the five lead wires composed of only the nickel-plated annealed copper wires were disconnected at the bend number of 1,300 to 1,400. On the contrary, none of the lead wires 6 of the embodiment was disconnected at the bend number of 10,000. It is, therefore, understood that the temperature sensor of the embodiment has a high bending resistance and a high durability.

Moreover, the tensile strength tests were done on both the lead wires, which were composed of only the nickel-plated annealed copper wires of a sectional area of 0.60 mm$^2$ at their conductor portions, and the lead wires 6 of the embodiment. In the tests, there were prepared the individual lead wires each having the straight portion of a length of 200 mm and chuck portions at its two ends, and the lead wires were pulled at a speed of 50 mm/min by using a tensile compression tester (SL-2001) of IMADA, and their strengths were measured when their straight portions were broken. As a result, the lead wires composed of only the nickel-plated annealed copper wires had an average tensile strength of about 205 N. On the contrary, the lead wires 6 of the embodiment had an average tensile strength of about 270 N. It is, therefore, found that the temperature sensor of the embodiment has a high durability, too, in the high tensile strength.

According to the temperature sensor of the embodiment, therefore, it is understood that the temperature sensor can detect the temperature in an excellent precision without any correction according to the length of the lead wires 6, and that the temperature sensor can exhibit an excellent durability.

In this temperature sensor, moreover, the lead wires 6 have the first electric wires 8 of the nickel-plated annealed copper wires arranged around the second electric wires 7 of stainless steel at the central portion, so that they are individually caulked in the satisfactory manner and are suitably connected with the core wires 11 and the connector 19. Moreover, this temperature sensor has the second electric wires 7 made of easily available stainless steel wires so that its manufacturing cost can be lowered.

Here, the invention should not be limited to the embodiment thus far described, but can be modified in various manners. For example, the thermistor can be replaced as the thermo-sensitive element by the platinum resistance element. Here will be examined the difference in the resistance due to the difference between the lengths of the lead wires, in case the thermo-sensitive element is made of a platinum resistor having a TCR of 4,000 ppm/° C. and a resistance of 50 Ω at 0° C. In case the lead wires are made exclusively of SUS wires having a sectional area of 0.74 mm$^2$ at the conductor portion and a length of 2,500 mm, the lead wires have a resistance of 2.8 Ω. When the temperature sensor provided with the platinum resistance element having the above-specified characteristics is placed under the condition of 0° C., according to our calculations, the resistance of 2.8 Ω of the aforementioned lead wires corresponds, when converted into the temperature, to about 14° C. If the length difference of the lead wires is 2,500 mm between the two temperature sensors, there exists an error in the detected temperature of about 14° C. On the other hand, the lead wires 6 like those of the aforementioned embodiment having a conductor portion of a sectional area of 0.37 mm$^2$ and a length of 2,500 mm have a resistance of 0.225 Ω, and the temperature-converted value of the lead wires, at the time when the temperature sensor providing with the platinum resistance element having the aforementioned characteristics is placed under the condition of 0° C., corresponds to about 1.2° C. Even if the two temperature sensors have a lead wire length difference of 2,500 mm, therefore, what exists is the error of the detected temperature of about 1.2° C. In the temperature sensor of the embodiment using the platinum resistor as the thermo-sensitive element, therefore, it is understood that no temperature correction is necessary no matter how long the lead wires might be. By using the lead wires like those of the aforementioned embodiment, moreover, it is possible to provide a highly durable temperature sensor.

Figure 3:
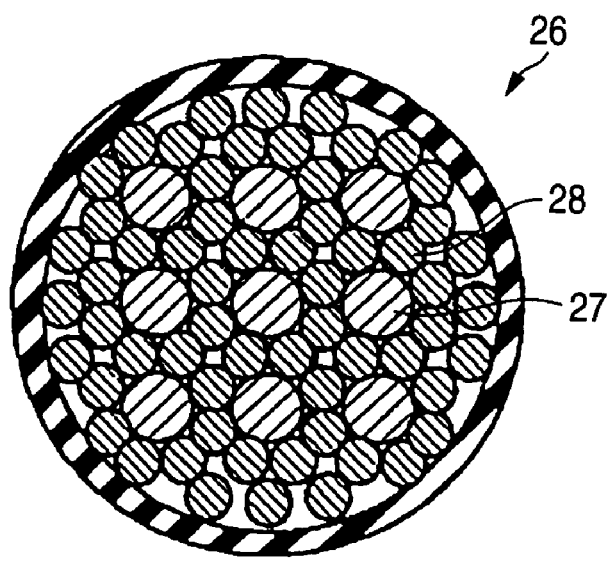
FIG. 3 is a sectional view of a lead wire according to the temperature sensor of a modification.

The aforementioned embodiment has adopted the lead wires 6, which are composed of the second electric wires 7 or the seven stainless steel wires at the central portion, and the first electric wires 8 or the twelve nickel-plated annealed copper wires enclosing the seven second electric wires 7, as shown in FIG. 2. However, the invention should not be limited to those lead wires 6 but could be applied to variations, which are not contrary to its gist. As shown in FIG. 3, for example, there can also be adopted a lead wire 26, which is composed of second electric wires 27 or a plurality of stainless steel wires, and first electric wires 28 or a plurality of nickel-plated annealed copper wires enclosing the individual second electric wires.

This application is based on Japanese Patent application JP 2003-1010, filed Jan. 7, 2003, the entire content of which is hereby incorporated by reference, the same as if set forth at length.

What is claimed is:

1. A temperature sensor comprising:
   a housing;
   a thermo-sensitive element housed in the housing for outputting electric characteristics varying with a temperature, as an electric signal; and
   a pair of lead wires connected at their one-side ends with the thermo-sensitive element for extracting the electric signal from the thermo-sensitive element to an outside of the housing,
   wherein at least one of the lead wires extending outside the housing is made of a mixed twisted wire including: first electric wires made of a first conductor containing copper; and second electric wires made of a second conductor having a higher bending resistance and a tensile strength than those of the first conductor; and
   wherein said mixed twisted wire comprises the first electric wires enclosing the second electric wires.

2. The temperature sensor according to claim 1, wherein each of the lead wires is made of a mixed twisted wire including: first electric wires made of a first conductor containing copper; and second electric wires made of a second conductor having a higher bending resistance and a tensile strength than those of the first conductor.

3. The temperature sensor according to claim 1, wherein the second conductor contains nickel.

4. The temperature sensor according to claim 3, wherein the second conductor is made of stainless steel.

5. A temperature sensor comprising:
   a housing;
   a thermo-sensitive element housed in the housing for outputting electric characteristics varying with a temperature, as an electric signal; and
   a pair of lead wires connected at their one-side ends with the thermo-sensitive element for extracting the electric signal from the thermo-sensitive element to an outside of the housing,
   wherein at least one of the lead wires extending outside the housing is made of a mixed twisted wire including: second electric wires made of a second conductor containing nickel; and first electric wires made of a first conductor having a lower electric resistance than that of the second conductor wherein the first conductor contains copper; and
   wherein said mixed twisted wire comprises first electric wires enclosing the second electric wires.

6. The temperature sensor according to claim 5, wherein each of the lead wires is made of a mixed twisted wire including: second electric wires made of the second conductor containing nickel; and first electric wires made of the first conductor having the lower electric resistance than that of the second conductor.

* * * * *